(12) United States Patent
Harck et al.

(10) Patent No.: US 6,800,204 B2
(45) Date of Patent: Oct. 5, 2004

(54) COMPOSITION AND PROCESS FOR REMOVING ARSENIC AND SELENIUM FROM AQUEOUS SOLUTION

(75) Inventors: John F. Harck, Sun Valley, NV (US); Stephanie Wilkis, Sparks, NV (US); Ivan Winters, Sun Valley, NV (US)

(73) Assignee: Clear Water Filtration Systems, Reno, NV (US)

( * ) Notice: Subject to any disclaimer, the term of this patent is extended or adjusted under 35 U.S.C. 154(b) by 42 days.

(21) Appl. No.: 10/266,240

(22) Filed: Oct. 8, 2002

(65) Prior Publication Data

US 2003/0155303 A1 Aug. 21, 2003

Related U.S. Application Data

(60) Provisional application No. 60/357,616, filed on Feb. 15, 2002.

(51) Int. Cl.$^7$ .................................................. C02F 1/28
(52) U.S. Cl. ........................ 210/683; 501/126; 501/152
(58) Field of Search ................................ 210/665, 683, 210/688; 501/94, 126, 152

(56) References Cited

U.S. PATENT DOCUMENTS

| | | | |
|---|---|---|---|
| 5,017,532 A | * | 5/1991 | Sonnenberg et al. ........ 501/103 |
| 5,053,139 A | | 10/1991 | Dodwell et al. |
| 5,603,838 A | | 2/1997 | Misra et al. |
| 5,759,936 A | * | 6/1998 | Christiansen et al. ....... 501/152 |

* cited by examiner

*Primary Examiner*—Robert A. Hopkins
(74) *Attorney, Agent, or Firm*—John D. Long

(57) ABSTRACT

The invention is a new composition and process for lanthanum oxide concentrate that is used to significantly reduce arsenic and/or selenium concentration levels in aqueous solutions. The lanthanum oxide concentrate is a mixture of lanthanum oxide and one or more oxides from the following group: neodymium oxide, cerium oxide, parseodymiun oxide, strontium oxide, calcium oxide and sodium oxide. The process of manufacture comprises the steps of sintering the lanthanum oxide concentrate, then washing the resultant media. The process of use is the contact of the lanthanum oxide concentrate with an aqueous solution containing arsenic and/or selenium whereby the lanthanum oxide concentrate removes at least a portion of the arsenic and/or selenium from the aqueous solution.

14 Claims, No Drawings

COMPOSITION AND PROCESS FOR REMOVING ARSENIC AND SELENIUM FROM AQUEOUS SOLUTION

This application claims benefit of U.S. application No. 60/357,616, filed Feb. 15, 2002 which is a continuation in part of commonly assigned, copending application Ser. No. 09/965,381 filed Sep. 27, 2001, which is: (1) a continuation-in-part of application Ser. No. 09/844,726 filed Apr. 27, 2001, which is, a continuation-in-part of application Ser. No. 09/797,334 filed Mar. 1, 2001, now abandoned; and (2) a continuation-in-part of application Ser. No. 09/247,629 filed Feb. 10, 1999.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of Invention

The present invention relates to a composition of a lanthanum (a rare earth element) concentrate, a process for manufacturing of the composition, and a process for using the composition to remove the toxic forms of selenium and arsenic from water. In particular, the composition uses lanthanum oxides in conjunction with other oxides to form a filtration media that does not dissolve to any great extent in water that it is filtering.

2. Description of the Related Art

The need for potable water is currently being recognized as a high priority for governments worldwide in response to growing populations in areas with limited water supplies. This is particularly true for the United States with projections of continued population growth over the next several decades in its Southwest and Northeast regions. It is these western regions, which have large areas of desert, which by their definition have limited rainfall and corresponding limited water resources. As a result, municipalities of growing population centers in these areas are increasingly tapping into and relying upon large underground aquifers (well water supply) to obtaining the necessary water supply for their growing communities. On the eastern portion of the United States, where there is limited reservoir water supplies, municipalities face the same challenge as new population growth in that area has also pushed the demand for increased aquifer fed water supply.

Although there are concerns regarding the pollution of underground water from mining, refining, manufacturing and other industrial type operations and concerns, toxins, including elements such as arsenic, selenium and other elements are also naturally found in the ground where water aquifers are present and naturally 'contaminate' the water percolating through such aquifers. When such toxic elements leach from natural underground deposits into well saturated aquifers, the toxic elements will, over a period of time, spread throughout and dilute into very small minute trace non-hazardous amounts. However, under drought conditions when such aquifers are not fully replenished by natural rain or snow fall, such toxic water-borne elements concentrate into unacceptably dangerous concentrations which are injurious to human heath when ingested.

In other areas, such as India and China, the two most populous countries in the world, naturally occurring underground deposits of arsenic and selenium contaminate the drinking water. In some areas of these countries, the situation is so dire that arsenic and selenium water poisoning has become unavoidable and causes chronic or fatally acute poisoning.

There is also concern by many industrialists, who take great pride in maintaining green and environmentally friendly operations, to properly ensure that any industrial effluent be cleansed of any toxins before being released into the open environment. To meet this challenge, industrialists often meet, then exceed, current and future governmental environmental mandates regulating the waste discharge from industrial concerns. At the same time, in order to remain competitive, industrialists try to find pollution control means that are economic and practical in reclaiming harmful elements from waste discharge that might have any contact with outside bodies of water, both above and below ground.

Of the two contaminates in concern, the element Arsenic (As) is a metal commonly found in nature and can naturally contaminate underground water supplies. It is naturally found in an ionic form (the −3, 0, +3, and +5 oxidation states). This means that when the element has excess or a depletion of its negatively charged electrons ($e^-$), the element becomes a charged ion (e.g., $As^{-3}$). When arsenic (As) gains three electrons ($3e^-$) in addition to its normal complement of electrons ($e^-$), arsenic (As) converts to its −3 oxidation state to become the negatively charged ion form of the element, $As^{-3}$. When arsenic (As) loses five electrons ($5e^-$) from its normal complement of electrons ($e^-$), this gives arsenic (As) its positive oxidation state or the positive ionic form of $As^{+5}$. Arsenic (As) loses its electrons ($e^-$) when it is dissolved into water ($H_2O$). At that time, the oxygen (O) from water cleaves off from the hydrogen ($H_2$) to form new ionic compounds with the ionic forms of dissolved arsenic. The most common forms of ionic arsenic found in drinking water and wastewater streams being ($As^{+3}$) and ($As^{+5}$). These arsenic ions combine with negatively charged oxygen ions ($O^-$) called oxygen anions or oxyanions.

The toxicity of arsenic (As) dissolved in water depends on the arsenic's oxidation in water. Arsenate ($As^{+5}$) is reported to be less toxic that arsenite ($As^{+3}$) and other forms of arsenic based compounds such as methylated arsenic and the like. The level of arsenic (As) in water beyond 0.05 micrograms per liter (ug/l) is known to cause carcinogenic effect in human beings. The United States Environmental Protection Agency (EPA), in monitoring the health and environmental concerns regarding arsenic (As) levels in water, has promulgated a new Maximum Contaminant Level (MCL) of 10 parts-per-billion (ppb) in drinking water (i.e., ten parts of arsenic per billion parts of water). Under federal mandates, any water having higher levels of arsenic (As) than the MCL will be found to be unfit and dangerous for human consumption.

Selenium (Se), the other element of toxic concern, is also a naturally occurring element. In comparison with Arsenic (As), however, selenium (Se) is naturally found in much smaller quantities so as to be considered an essential trace element, which is practically nontoxic. Like arsenic (As), selenium (Se) can be found in an ionic form in water such as selenite, $Se^{+4}$ and selenate, $Se^{+6}$ where it loses its electrons ($e^-$) when it dissolves into water ($H_2O$). The oxygen (O) cleaves off from the hydrogen (H) of the water to form a new ionic compound with the selenium (Se). The oxygenated ionic forms of selenium (Se) are selenite ($Se_2O^{-2}$) and selenate ($Se_3O^{-2}$), respectively.

In nature, the deficiency of selenium (Se) in some animal diets, such as the longhorn sheep, can cause weakness in the animals' young. On the other extreme, the over accumulation of selenium (Se) in the locoweed, as consumed by cattle, horses and the like, can cause the imbibing animal to exhibit manic characteristics.

It is, however, the presence of various man-made compound forms of selenium (Se) in water that is of the most environmental concern. Selenium (Se) compounds such as hydrogen selenium, selenium sulfide, selenium dioxide ($SeO_2$), selenium oxychloride ($SeOCl_2$) and the like are extremely toxic and can resemble arsenic (As) poisoning in their physiological reactions.

In order to address these environmental concerns of the presence of Arsenic (As) and Selenium (Se) compounds in aqueous (water) solution, either as naturally occurring in water or as part of the reclamation of such chemicals from industrial waste water or runoff, various techniques have been developed so that water, whatever its source, can be purified of these harmful chemicals to make the water safe for drinking.

The removal of Arsenic (As) from water can be accomplished through chemical precipitation of arsenic (As) though the addition of lime, alum or an iron salt at an appropriate acidity (pH) to the contaminated water. The combination of the Arsenic (As) with lime or salt will cause the arsenic (As) to form a insoluble compound that solidifies or precipitates out of the water for easy removal. Other scientific methods rely on the removal of the ionic form of the element from contaminated water using techniques such as ion exchange, reverse osmosis, electrolysis or distillation. These techniques rely on the ionic form of the toxic element/compound being smaller or lighter than water, or the electrical charge of the ion distinguishing the ion and separating it out from water. These techniques, which are generally recognized for removing toxic heavy metals from water, are less effective with selenium (Se) or arsenic (As) and are especially limited both economically and for purifying great volumes of water. It can be very difficult for these conventional heavy metal removal methodologies to remove trace amounts of arsenic (As).

Still other water treatment methods have been employed to achieve acceptable removal of arsenic from contaminated water, including the use of immobilized iron ($Fe^{+3}$) in the form of micro particulate iron oxides, iron loaded cation exchange resins; and activated alumina (aluminum oxide or $Al_2O_3$). All of these methods are expensive and require labor-intensive process management. Most methods fail to provide a reduction in contaminants sufficient to meet the new EPA/NSF standards for drinking water.

Aqueous decontamination of Selenium (Se) can be accomplished when the dissolved form selenium (Se) is in its water based ionic forms of selenite ($Se_2O^{-2}$) (i.e., $Se^{+4}$) and selenate ($Se_3O^{-2}$) (i.e. $Se^{+6}$). In this form, precipitation methodologies treat the selenium (Se) contaminated water with an iron (Fe) salt such as ferric or ferrous oxide, chloride, or hydroxide or with Aluminum (Al) or Zinc (Zn) in some appropriate form such as powder or granules which causes the precipitation of the resulting insoluble compound containing the selenium (Se). However, the above methodology only has limited effect on the ionic form of selenium $Se^{+6}$. As a result, other extraction methodologies such as ion exchange or reverse osmosis are used, although as discussed earlier, these treatments are not economical for treating large quantities of contaminated water.

One other purification technique for water contaminated with ionic forms of selenium or arsenic is using oxide forms of the elements lanthanum (La) and aluminum (Al) which are lanthanum oxide ($La_2O_3$) and alumina (aluminum oxide, $Al_3O_2$), respectively. The U.S. Pat. No. 5,603,838 issued Feb. 18, 1997 to Misra, et al (hereinafter '838 patent) teaches that lanthanum oxide ($La_2O_3$) by itself or together with alumina (i.e., aluminum oxide or $Al_3O_2$) can remove ionized forms of arsenic (As) and selenium (Se) in contaminated water.

Both elements, lanthanum (La) and aluminum, are normally found naturally in ores and are normally found bound with oxygen ($O_2$) to make oxides or ceramics. The '838 patent teaches the use of lanthanum oxide ($La_2O_3$) by itself or combined with alumina (aluminum oxide, $Al_3O_2$) where the resulting composition contains ten (10%) percent to one hundred (100%) percent of lanthanum oxide ($La_2O_3$). The gamma activated or commercial grade alumina (aluminum oxide, $Al_3O_2$) is used in substitution since the alumina is much less expensive than the pure lanthanum oxide ($La_2O_3$) and decreases the overall cost of the resulting composition.

According to the '838 patent, the granules of lanthanum oxide ($La_2O_3$) or granules of lanthanum oxide ($La_2O_3$)-alumina (aluminum oxide, $Al_3O_2$) composition are placed in a packing column. The packing column consists of a glass cylinder with an open top that receives the contaminated water and a narrow opening at the bottom which regulates the flow of water going through the column and hence the contact time of the contaminated water and the lanthanum granules in the column. The selenium (Se) and Arsenic (As) contaminated water is introduced at the top of the column and passed through the column, where it is collected from the bottom end of the column and reintroduced at the top for recirculation from five (5) to thirty (30) minutes.

The actual testing of the samples in '838 patent was accomplished by placing the lanthanum oxide ($La_2O_3$) or a compound of lanthanum oxide ($La_2O_3$)-alumina (aluminum oxide, $Al_3O_2$) in a flask containing selenium (Se) and arsenic (As) contaminated water. The flasks were then swirled to mix the oxides and the contaminated water. The mixture was then poured through Whatman number 5 filter paper and the filtered water was then tested for presence of selenium (Se) and arsenic (As) presence.

The sample testing showed that lanthanum oxide ($La_2O_3$) or lanthanum oxide ($La_2O_3$)-alumina (aluminum oxide, $Al_3O_2$) composition did successfully and significantly remove the presence of selenium (Se) and arsenic (As) from the contaminated water. In simple terms the oxide or oxide composition in granular form acted as "flypaper" to remove the selenium (Se) and arsenic (As) ions from the contaminated water.

To release the selenium (Se) or arsenic (As) from the lanthanum oxide ($La_2O_3$) or lanthanum oxide ($La_2O_3$)-Alumina (aluminum oxide, $Al_3O_2$) compositions, the oxide/oxide composition was washed with a solution of sodium hydroxide (NaOH) to remove the absorbed selenium (Se) and arsenic (As) ions.

The '838 patent disclosed that lanthanum (La) is effective as a removal agent for selenium (Se) and arsenic (As) because the high positive charge of the grain surface of the lanthanum oxide ($La_2O_3$) attracts the highly negative charged oxyanions of selenium (Se) and arsenic (As) in order to make lanthanum oxide ($La_2O_3$) a very effective water contaminate removal agent.

However, there are two remaining issues from '838 patent methodology that seriously impede, or make impossible, the grand scale application of this technique to treat vast amounts of selenium (Se) and arsenic (As) contaminated water. First, the expense of refined lanthanum oxide ($La_2O_3$) as used in this operation is cost prohibitive.

Secondly, the lanthanum oxide ($La_2O_3$) does not bind well to itself or to alumina (aluminum oxide, $Al_3O_2$). Lanthanum oxide ($La_2O_3$) dissolves when contacted with water and washes away in the water along with those pollutants adhering to it.

Likewise, attempts to use lanthanum based oxides and compounds as taught in U.S. Pat. No. 5,053,139 issued to Dodwell in 1991 (hereinafter '139 patent), such as complex lanthanides fused alumina, iron, silica and other "carrier" media in order to provide a product of suitable particle size and affordability to be useful as a filtration media, also have seen the above described limitation on their effectiveness. Complex lanthanides such as lanthanum silicate, as used in silica gel-based filtration devices, have the same tendency of standard lanthanum oxide, to "wash away" from the carrier grains to which they were originally bound.

This washing away of lanthanum oxides/complexes includes reduction in the size of a lanthanum oxide/complex granular media down to a very fine particulate state, which eventually causes the blockage of any downstream filters or filtration devices. Worse, the escape of the lanthanum media and its bound contaminants from the filtration containment vessels results in the unwanted (and unsuspected) release of potentially toxic concentrations back into a supposedly purified water supply.

There have also been other attempts, in the field of ceramics, to fuse lanthanum oxide to the outside surface of alumina grains at high temperatures in order to reduce the high expense of technical or even more expensive research grades of lanthanum oxides for use in the lanthanum oxide/ composition filtration. Even though fused, lanthanum oxide still has a weak bonding capability and will wash away from the alumina grain in the presence of water.

What is needed therefore, is a practical, cost-effective, lanthanum-based composition and process, which will prevent or significantly reduce the dissociation or washing away of the lanthanum oxide in the presence of water. This will allow large-scale application of lanthanum oxide purification for vast bodies of water and further reduce the likelihood of downstream blockage of standard filtration systems from the resultant undesired release of lanthanum oxides/pollutant complexes downstream from a filtration process.

SUMMARY OF THE INVENTION

The present invention consists of a composition and process lanthanum oxide media that is suitable for composing an inexpensive filtration media that effectively removes arsenic and selenium contaminates from water. Lanthanum oxide media also will not allow the lanthanum oxide to wash away or disassociate itself from the carrier grain in the presence of water; thereby preventing causing downstream blockage of a filtration system or allowing release of filtration media downstream of the filtration system for contamination of supposedly purified water. Further, the invention will allow the lanthanum oxide based filtration media to be used satisfactorily in large-scale water purification systems (e.g., municipal water treatment facilities) that handle tremendous quantities of water.

The invention is a composition comprising of lanthanum oxide and at least one oxide from a group consisting of neodymium oxide ($Nd_2O_3$), cerium oxide ($CeO_2$), praseodymium oxide ($Pr_6O_{11}$), strontium oxide (SrO), calcium oxide (CaO) and sodium oxide (NaO).

The process of making the composition consists of using as a base, a lanthanum concentrate available from Molycorp, Inc. Mountain Pass Calif. as product entitled Code 5210 Lanthanum Concentrate. The concentrate comes as a granular media granular size range of 0.84 mm–0.25 mm which is suitable for use with a standard water filter using a 60-20 mesh. The granular media is then sintered to fuse the oxides in each grain together. The sintered media is then washed to remove any loose or unsintered particulate matter away from sintered media.

In use, the first step has the sintered lanthanum oxide concentrate media placed in contact with aqueous solution containing arsenic and or selenium in their oxyanion form (i.e., (selenite, selenate, arsenate and arsenite). The oxyanion in the solution binds with the sintered lanthanum oxide concentrate to form an insoluble complex comprising of lanthanum oxide and said oxyanion. The solution is then removed from said insoluble complex.

It is an object of this invention to provide a practical, economical, easily manufactured, filtration media that can effectively remove arsenic and selenium from an aqueous solution. It is another object of this invention to provide a filtration media that removes arsenic and selenium from an aqueous solution without significantly dissolving in water. It is a further object of this invention to provide a lanthanum oxide filtration media that will not break down into fine particulate matter thereby blocking downstream filtration devices. It is yet another object of this invention to provide a lanthanum oxide filtration media that will prevent the downstream release of aqueous contaminates.

DETAILED DESCRIPTION OF THE INVENTION

The invention is a lanthanum oxide composition and process for making and using same to remove arsenic and selenium ionic concentrations in aqueous solution.

The composition is a compound of lanthanum oxide and one or more oxides from the following group: neodymium oxide, cerium oxide, praseodymium oxide, strontium oxide, calcium oxide and sodium oxide. The ratios by weight of the composition are lanthanum oxide ($La_2O_3$) 100.0% to 10.0%, (LnO) 90% to 10%, cerium oxide ($CeO_2$) 90% to 10%, neodymium oxide ($Nd_2O_3$) 90% to 01.0%; praseodymium oxide ($Pr_6O_{11}$) 90.0% to 01.0%, calcium oxide (CaO) 1.0% to 0.2% and strontium oxide (SrO) 1.0 to 0.1%. The preferred embodiment ratios by weight for the composition are lanthanum oxide ($La_2O_3$) 44.0%, LnO 78.0%, cerium oxide ($CeO_2$) 14.0%, %, neodymium oxide ($Nd_2O_3$) 13.0%, praseodymium oxide ($Pr_6O_{11}$) 5.0%, calcium oxide (CaO) 0.2% and strontium oxide (SrO) 0.1%.

The process of making the composition utilizes a lanthanum concentrate commonly known as lanthanum-rich or mixed-lanthanide hydroxide chloride or lanthanum RE hydrate. The preferred embodiment of invention utilizes lanthanum concentrate known commercially as product code 5210 Lanthanum Concentrate available from Molycorp, Inc., a Unocal Company, located at 1201 West 5$^{th}$ Street, Los Angeles Calif. 90017. In the preferred embodiment of the invention, the lanthanum concentrate is in granular form and has a composition by weight of Lanthanum Oxide ($La_2O_3$) 44.0%, LnO 78.0%, $CeO_2$ 14.0%, $Nd_2O_3$ 13.0%, $Pr_6O_{11}$ 5.0%, CaO 0.2% and SrO. The lanthanum concentrate is formed during the refining process of the mineral ore bastasite (where lanthanum oxide is found naturally). During the process of crushing of bastasite, lanthanum oxide in a purer form is extracted. This extraction is accomplished through a series of milling and floating circuits, where the previously processed bastasite ore, which is the lanthanum concentrate, is re-fed into the processing circuit while new bastasite is added to the circuit. The lanthanum concentrate with its low levels of lanthanum oxide is considered the dregs of this refinement process and not worthy of direct refinement itself.

The lanthanum concentrate is the floatation effluent that is wet screened to selectively capture the middlings in the 60-20 mesh range and to wash most of the fine particulate matter away. These middlings are then dried to form a granular media which becomes the lanthanum concentrate product as sold by Molycorp, Inc. The resultant granular size range of 5210 Lanthanum Concentrate is 0.84 mm–0.25 mm which is suitable for use with standard water filter that utilizes a 60-20 mesh.

The first step for converting the 5210 Lanthanum Concentrate into the lanthanum oxide filtration media is to sinter the 5210 Lanthanum Concentrate by heating it to 350 deg. C. to 600 deg. C., preferably at 520 deg. C., for somewhere between one and nine hours depending on the original moisture content of the feed media. If the moisture content of the 5210 Lanthanum Concentrate is one percent (1.0%) or less then the 5210 Lanthanum Concentrate should be sintered at 350 deg. C. for three (3) hours. If the moisture content of the 5210 Lanthanum Concentrate is greater than one (1.0%) percent then sintering should be done at 600 deg. C. for nine (9) hours.

This heating is done first to remove moisture from the 5210 Lanthanum Concentrate and then to sinter or fuse the lanthanum oxide and the other oxides in the 5210 Lanthanum Concentrate into grains of fused material that will not dissolve in water and will prevent dissociation of the lanthanum oxide from the fused grain. The second step is to wash the sintered grains to remove any particulate matter or unsintered matter from the surface of the sintered grains and rescreen the sintered grains to the proper grain size range. The lanthanum oxide composition is then ready to be used for the removal of arsenic and selenium form aqueous solutions. More specifically, the composition is ready for use as a filtration media for the decontamination of water bearing dissolved arsenic and selenium in their oxyanion form (i.e., the ionic species selenite, selenate, arsenate and arsenite).

The process of utilizing the composition for the removal of at least one aqueous ionic species selected from a group consisting of arsenic and selenium in solution, comprising the steps of:

a) contacting said solution with a composition comprised of lanthanum oxide and at least one oxide from a group consisting of a solution containing LnO, cerium oxide ($CeO_2$) neodymium oxide ($Nd_2O_3$), praseodymium oxide ($Pr_6O_{11}$), calcium oxide (CaO) and strontium oxide (SrO) whereby said ionic species is absorbed onto the said composition to form an insoluble complex comprised of lanthanum oxide and said ion; and b) separating said solution from said complex.

In accordance with the above-described mechanics of how this invention works to remove the ionic aqueous forms of arsenic and selenium, there is provided a water treatment device. This apparatus comprises of a chamber for containing the lanthanum concentrate filtration media during contact with aqueous solution containing selenium and/or arsenic. The chamber is further connected with an inlet port for allowing contaminated aqueous solution into the chamber and an outlet port for allowing post concentrate contact aqueous solution out of the chamber.

In one embodiment of the apparatus, the apparatus is a water filtration system that forms an accessible chamber with a water entry port and a purified water exit port. The chamber holds a replaceable filtration cartridge that contains processed lanthanum concentrate or other lanthanum oxide media. The cartridge also has a water entry port and a purified water exit port that are oriented to match up the chamber's water entry and purified water exit ports. In this manner, the aqueous solution arrives in the chamber to contact with the processed lanthanum concentrate or other lanthanum oxide media of the replaceable filtration cartridge before passing out of the chamber. When the filtration media has reached its saturation point, the filtration cartridge is replaced with a fresh one. The spent filtration cartridge can then be safety disposed of without fear of environmental contamination since the very strong and durable ionic bond formed between the lanthanides and the contaminants prevents the disassociation of the contaminants from the media under environmental conditions, thus rendering the loaded media easily disposable as a non-toxic waste.

In another embodiment of the apparatus, such as the large-scale water filtration system of a municipal water treatment plant, the filtration media is comprised of large tanks filled with processed lanthanum concentrate or other lanthanum oxide filtration media. The tank similarly has water inlet and outlet ports to allow water to flow into the tank, contact with the filtration media and then egress from the tank.

At a point when the filtration media is saturated, the tank is disconnected from the water supply. It is then backwashed with sodium hydroxide (NaOH) or potassium hydroxide (KOH). The sodium hydroxide (NaOH) or potassium hydroxide (KOH) removes the contaminates from the saturated lanthanum oxide filtration media to rejuvenate the media. The sodium hydroxide (NaOH) or potassium hydroxide (KOH) solution with the contaminates is then reprocessed to remove the contaminates from the sodium/potassium hydroxide solution. In this manner, the contaminates can be recycled into usable chemicals.

The present invention can be carried out on wide variety of sizes from an attachment device to stand alone apparatus. This invention can be used and embodied in a portable personal device or attached as a home-use water filtration unit that utilizes a replaceable flow-through water filter cartridge. The invention can also be scaled up for large commercial and industrial usage such as those water purification systems used by municipal water treatment plants.

The process of sintering the lanthanum concentrate can be carried out using continuous flow treatment processing or high volume batch processing using commercially available handling equipment setup to enable the use of the preferred solid-phase media.

Using presently available water processing equipment, it is expected that the present water treatment process for removal of arsenic concentrations in drinking water and wastewater streams can be carried out at flow rates ranging from as little as 0.5 gallons per minute to approximately 1.0 gallons per minute per 0.025 cubic feet of lanthanum-concentrate media, at the EPA recommended pH for drinking water.

The process of the present invention is capable of reducing arsenic concentrations by more than 90% and under optimum operating conditions can enable reduction of arsenic concentrations to less than 10 parts per billion range or even lower, meeting drinking water standards.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative.

We claim:

1. A process for removing an oxyanion from solution, the oxyanion being removed is selected from a group of oxyanions consisting of selenite, selenate, arsenite and arsenate, comprising of the steps:

a) contacting said solution with a composition comprising of lanthanum oxide and at least one oxide from group consisting of LnO, $CeO_2$ $Nd_2O_3$, and $Pr_6O_{11}$, whereby said oxyanion is absorbed onto the said composition to form an insoluble complex comprising lanthanum oxide and said oxyanion; and b) separating said solution from said complex.

2. The process of claim 1 wherein the group further includes CaO and SrO.

3. The process of claim 1 wherein the said composition comprises at least 10 percent lanthanum oxide.

4. The process of claim 1 wherein selenite is removed.

5. The process of claim 1 wherein arsenite is removed.

6. The process of claim 1 wherein selenate is removed.

7. The process of claim 1 wherein arsenate is removed.

8. The process of claim 1 wherein said separation occurs in a water treatment device.

9. The process of claim 8 wherein said water treatment device comprises of a chamber for containing said composition during contact with solution that chamber being further connected with an inlet for allowing the solution into the chamber and an outlet for allowing solution out of the chamber.

10. The process of claim 1 wherein said process produces potable water.

11. The process of claim 1 wherein said composition retains lanthanum oxide after contact with solution.

12. A process for making a lanthanum oxide composition comprising:

a) sintering a lanthanum concentrate;

b) washing lanthanum concentrate; and c) screening lanthanum concentrate with a 60–20 mesh material.

13. A process for making a lanthanum oxide composition of claim 12 wherein the screening of the lanthanum concentrate produces lanthanum concentrate in 0.84 mm–0.25 mm grain size.

14. A process for making a lanthanum oxide composition of claim 12 further comprises granulating the lanthanum concentrate.

* * * * *